United States Patent
Hayakawa

(10) Patent No.: US 9,613,301 B2
(45) Date of Patent: Apr. 4, 2017

(54) PRINT DATA PROCESSING APPARATUS AND NON-TRANSITORY COMPUTER READABLE MEDIUM STORING PROGRAM FOR DEFORMING IMAGE ELEMENTS OF A WATERMARK FROM INTERMEDIATE PRINT DATA

(71) Applicant: FUJI XEROX CO., LTD., Tokyo (JP)

(72) Inventor: Michio Hayakawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/877,255

(22) Filed: Oct. 7, 2015

(65) Prior Publication Data

US 2016/0292545 A1   Oct. 6, 2016

(30) Foreign Application Priority Data

Apr. 1, 2015   (JP) .................... 2015-075211

(51) Int. Cl.
*G06K 15/02*   (2006.01)
*G06F 3/12*   (2006.01)

(52) U.S. Cl.
CPC ....... *G06K 15/1809* (2013.01); *G06F 3/1243* (2013.01); *G06F 3/1248* (2013.01); *G06F 3/1298* (2013.01); *G06K 15/1813* (2013.01)

(58) Field of Classification Search
None
See application file for complete search history.

(56) References Cited

U.S. PATENT DOCUMENTS

| | | | | |
|---|---|---|---|---|
| 8,384,964 B2* | 2/2013 | Sakaue | .............. | H04N 1/40062 358/2.1 |
| 8,593,466 B2* | 11/2013 | Barringer | .............. | G06T 15/005 345/502 |
| 8,705,118 B2* | 4/2014 | Smith | .................... | G06F 3/1204 358/1.1 |
| 2003/0016756 A1* | 1/2003 | Steenhof | .............. | G06T 1/0035 375/240.25 |
| 2007/0296749 A1 | 12/2007 | Mizutani et al. | | |
| 2008/0122868 A1 | 5/2008 | Mizutani et al. | | |

FOREIGN PATENT DOCUMENTS

| | | |
|---|---|---|
| JP | 2008-1068 A | 1/2008 |
| JP | 2008-17135 A | 1/2008 |
| JP | 2010-274534 A | 12/2010 |

* cited by examiner

*Primary Examiner* — Paul F Payer
(74) *Attorney, Agent, or Firm* — Sughrue Mion, PLLC

(57) ABSTRACT

Provided is a print data processing apparatus including an intermediate data acquisition section that acquires intermediate data which is generated from document data described in a page description language and includes plural image elements, an extraction section that extracts image elements of a watermark from among the image elements of the intermediate data acquired by the intermediate data acquisition section, a deformation section that deforms each of the image elements of the watermark extracted by the extraction section into a shape that does not include an overlapping portion between the image elements of the watermark, and an output section that outputs an image element group of the watermark deformed by the deformation section, to an image data generation device that generates image data for a printing device from the intermediate data.

5 Claims, 7 Drawing Sheets

PRINT DATA PROCESSING APPARATUS AND NON-TRANSITORY COMPUTER READABLE MEDIUM STORING PROGRAM FOR DEFORMING IMAGE ELEMENTS OF A WATERMARK FROM INTERMEDIATE PRINT DATA

CROSS-REFERENCE TO RELATED APPLICATIONS

This application is based on and claims priority under 35 USC 119 from Japanese Patent Application No. 2015-075211 filed Apr. 1, 2015.

BACKGROUND

Technical Field

The present invention relates to a print data processing apparatus and a non-transitory computer readable medium storing a program.

A watermark technique of printing letters, such as "confidential", or an image on a document in an overlapping manner is known. In processing of printing such a document including a watermark, a page memory dedicated for the watermark is prepared separately from a page memory for the main document, and an object group configuring the watermark is depicted in the dedicated page memory in the related art. Then, an image of the page with the watermark is formed by synthesizing a bitmap image of the watermark formed on the page memory with a bitmap image of the page of the main document formed on the page memory for the main document, and the image is printed on paper.

SUMMARY

According to an aspect of the invention, there is provided a print data processing apparatus including:

an intermediate data acquisition section that acquires intermediate data which is generated from document data described in a page description language and includes plural image elements;

an extraction section that extracts image elements of a watermark from among the image elements of the intermediate data acquired by the intermediate data acquisition section;

a deformation section that deforms each of the image elements of the watermark extracted by the extraction section into a shape that does not include an overlapping portion between the image elements of the watermark; and an output section that outputs an image element group of the watermark deformed by the deformation section, to an image data generation device that generates image data for a printing device from the intermediate data.

BRIEF DESCRIPTION OF THE DRAWINGS

Exemplary embodiments of the present invention will be described in detail based on the following figures, wherein.

DETAILED DESCRIPTION

Figure 1:
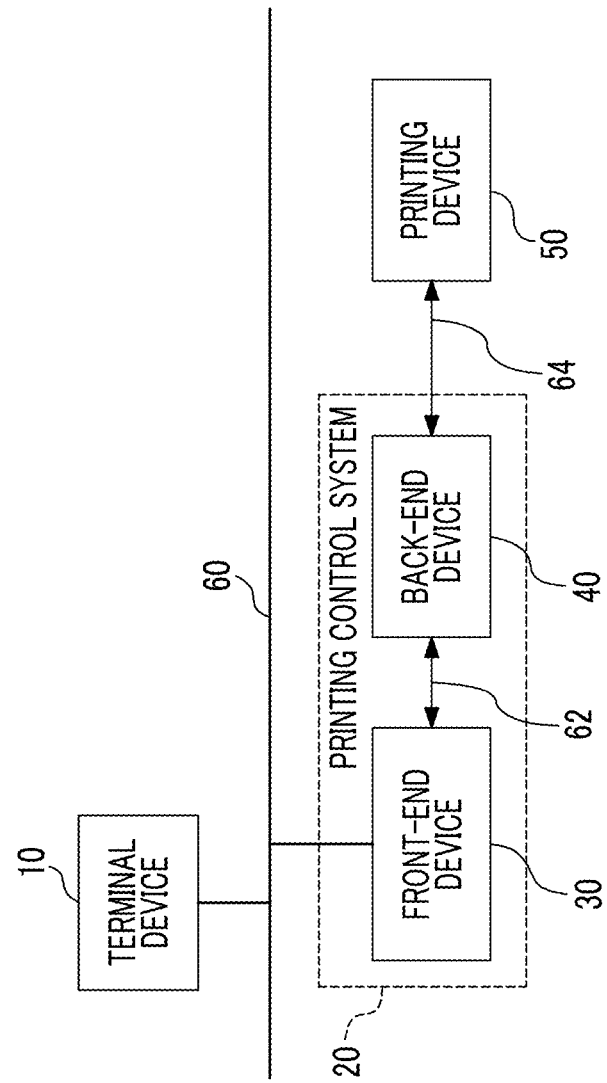
FIG. 1 is a block diagram illustrating an exemplary configuration of an image processing system.

FIG. 1 is a block diagram illustrating an exemplary configuration of an image processing system. The system in the example illustrated in FIG. 1 is provided with a terminal device 10, a printing control system 20, and a printing device 50. The printing control system 20 includes a front-end device 30 and a back-end device 40. The terminal device 10 is connected to the front-end device 30 via a communication mechanism 60 and transmits a printing job including a document printing command to the front-end device 30 in response to an instruction from a user. The front-end device 30 is connected to the back-end device 40 via a communication mechanism 62, and the back-end device 40 is connected to the printing device 50 via a communication mechanism 64.

The communication mechanisms 60, 62, and 64 may be data communication networks such as a Local Area Network (LAN). The communication mechanisms 60, 62, and 64 may be the same communication mechanisms or may be different communication mechanisms. For example, the LAN may be used as the communication mechanism 60 between the terminal device 10 and the front-end device 30, and dedicated communication mechanisms, which are different from the LAN, may be used as the communication mechanism 62 between the front-end device 30 and the back-end device 40 and the communication mechanism 64 between the back-end device 40 and the printing device 50, respectively.

According to the system in the example illustrated in FIG. 1, the front-end device 30 processes the printing job that is transmitted from the terminal device 10, data acquired as a result of the processing is passed to the back-end device 40, and the printing device 50 performs printing based on depiction data (also referred to as raster data) that the back-end device 40 generates.

Each of the terminal device 10, the front-end device 30, and the back-end device 40 in the example illustrated in FIG. 1 may be realized by a general-purpose computer, for example. The computer has, as hardware, a circuit configuration in which a central processing unit (CPU), a memory (primary storage), various input/output (I/O) interfaces, and a communication interface, for example, are connected to each other via a bus. The computer exchanges data with other devices via the communication interface. In addition, input devices such as a keyboard and a mouse and a display device such as a Cathode Ray Tube (CRT) or a liquid crystal display are connected to the bus via an I/O interface, for example. Moreover, a fixed secondary storage device such as a hard disc drive (HDD) or a solid state drive (SSD) and a disc drive for reading mobile non-volatile recording media of various standards, such as a DVD and a flash memory are connected to the bus via an I/O interface. Such a drive functions as an external storage device for the memory. A program describing content of processing according to exemplary embodiments which will be described later is stored in a fixed storage device such as an HDD via a recording medium such as a CD or a DVD or via a network, and is then installed on the computer. The processing according to the exemplary embodiments which will be described later is realized by the program, which is stored in the fixed storage device, being read in the memory and being executed by the CPU.

In the exemplary embodiments which will be described later, a part of the functions of the back-end device 40 may be realized as hardware processing instead of software processing performed by executing the program. The hardware processing may be performed by, for example, using a processor which is referred to as a dynamic reconfigurable processor (DRP) and is capable of dynamically reconfiguring a circuit in the course of processing. Alternatively, the hardware processing may be performed by using a circuit such as an application specific integrated circuit (ASIC). The back-end device 40 may be realized by configuring a hardware element, such as a DPR or an ASIC, that executes a part of the functions of the back-end device 40 in advance and connecting such a hardware element to the bus of the general-purpose computer, for example.

As a specific example of hardware that realizes the front-end device 30 and the back-end device 40, it is considered that a blade server with plural information processing devices, each of which functions as a server, installed in a single case body is used. The blade server is a server device in which a general-purpose computer provided with a CPU and a memory is embodied on a single substrate (blade) and plural blades are installed in a case body. For example, a single blade installed in the blade server may function as the front-end device 30, and another blade therein may function as the back-end device 40. Alternatively, each of the front-end device 30 and the back-end device 40 may be realized by plural blades installed in the blade server.

It is a matter of course that these are merely examples, and the front-end device 30 and the back-end device 40 may be configured on the individual computer devices that are installed in the individual case bodies. Alternatively, the front-end device 30 and the back-end device 40 maybe configured on the same computer device (that is, programs for performing the processing of the respective devices may be executed on the same computer).

The printing device 50 is a device that performs printing on a medium such as a paper, and may be a continuous paper printer or a cut paper printer, for example. In addition, a printing system of the printing device 50 is not particularly limited and may be an electrophotographic system or an inkjet system. Alternatively, another system is also applicable.

Although FIG. 1 shows only one front-end device 30 and only one back-end device 40, two or more front-end devices 30 and two or more back-end devices 40 may be provided and made to execute processing in parallel.

Figure 2:
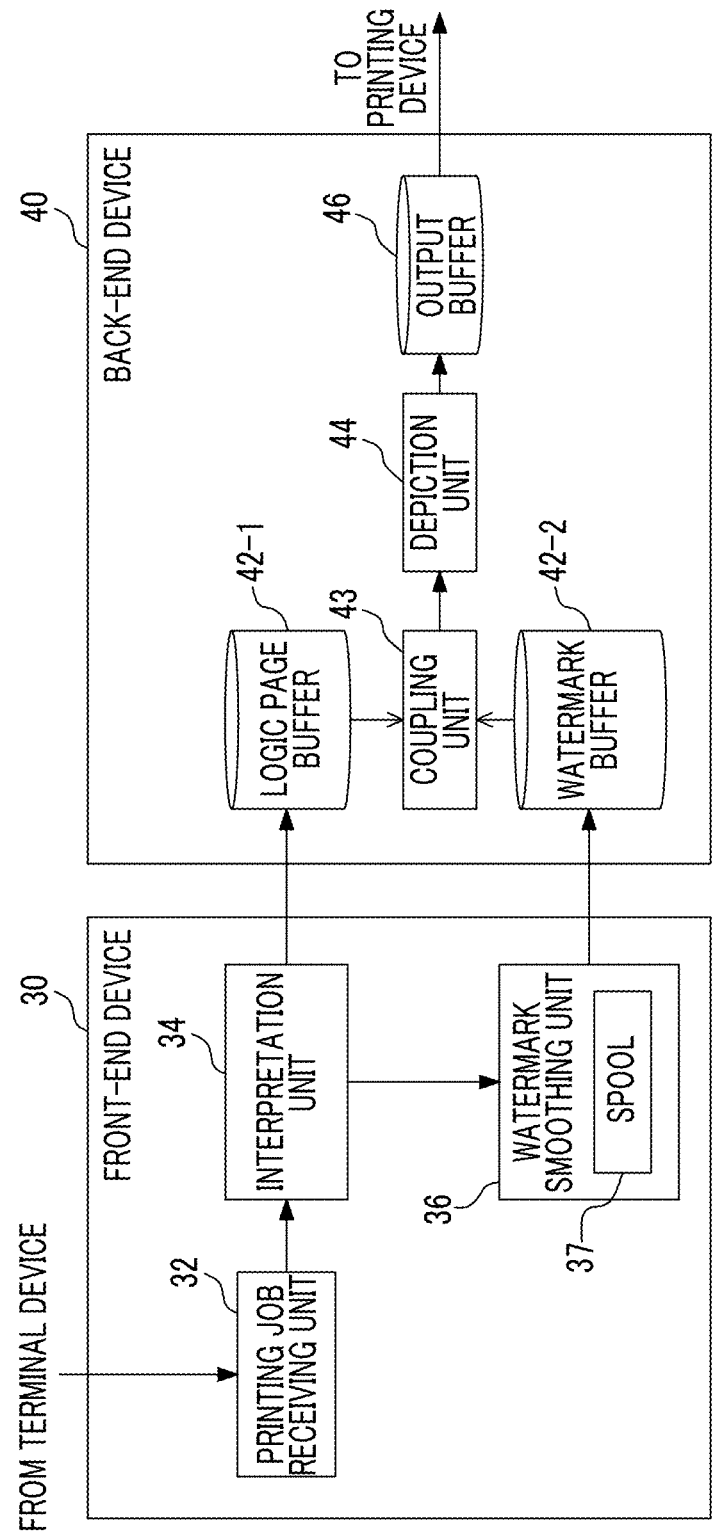
FIG. 2 is a diagram illustrating exemplary functional configurations of a front-end device and a back-end device included in a print control system.

FIG. 2 illustrates an exemplary functional configurations of the front-end device 30 and the back-end device 40 included in the printing control system 20. The front-end device 30 is provided with a printing job receiving unit 32, an interpretation unit 34, and a watermark smoothing unit 36. The back-end device 40 is provided with a logic page buffer 42-1, a watermark buffer 42-2, a coupling unit 43, a depiction unit 44, and an output buffer 46.

The printing job receiving unit 32 of the front-end device 30 receives a printing job from the terminal device 10. In the example of this exemplary embodiment, the printing job includes a command for printing a document and data describing the document as a target of printing in a page description language. The page description language (abbreviated as a PDL) is a computer programming language for causing an information processing device to execute display processing and print processing, for example. Examples of the page description language include PostScript (registered trademark) and Portable Document Format (PDF). Data described in the page description language includes position information, format information, and color information of objects such as characters, figures, and images (bitmap images) that configure the document as a target of printing. In the following description, the data describing the document as a target of printing in the page description language will be referred to as "PDL data". The printing job receiving unit 32 passes the PDL data included in the received printing job to the interpretation unit 34.

The interpretation unit 34 interprets the PDL data acquired from the printing job receiving unit 32, generates intermediate data, which includes a command representing a procedure for generating depiction data, in response to a result of the interpretation, and outputs the intermediate data. The depiction data is print image data expressed in a format in which the image as a target of printing may be handled by the printing device 50, and data in the raster format is an example thereof. The intermediate data is data with intermediate granularity between the PDL data and the depiction data. The intermediate data format expresses the image object described in the PDL while refining the image object into fine elements with a simpler shape. As an example of the intermediate data format, a display list format is known. Alternatively, the intermediate data format described in JP-A-2011-150535 and JP-A-2015-005131 by the present applicant may be used. In such a case, resolution of the intermediate data is set to be the same as the resolution of the printing device 50, and a coordinate system of the intermediate data is expressed by the same pixel coordinate system of the printing device 50 (that is, a coordinate system that expresses coordinates in units of pixels in the printing device 50). In doing so, the processing performed by the depiction unit 44 of the back-end device 40 does not require resolution conversion, and no gap occurs at a boundary between objects after deformation which is performed by the watermark smoothing unit 36 for eliminating an overlapping portion between the objects (which will be described later in detail).

The interpretation unit 34 interprets the PDL data, thus breaks down the respective objects represented by the PDL data into a unit shape (such as a shape of a rectangular format, a run format, or a raster format) that is used in the intermediate data format, and generates data representing a shape and a color of each unit shape (this represents objects in the intermediate data format).

The interpretation unit 34 determines which of a watermark and a logic page of the main document the PDL data represents. Then, the intermediate data generated from the PDL data that represents the watermark is output to the watermark smoothing unit 36, and the intermediate data generated from the PDL data that represents the logic page of the main document is output to the logic page buffer 42-1 of the back-end device 40. The interpretation unit 34 sequentially interprets the respective objects in the PDL data and passes the objects in the intermediate data format, which are generated as a result of the interpretation, to the logic page buffer 42-1 and the watermark smoothing unit 36 in the later stage in an order of the generation.

Here, the watermark is a text or an image that is to be displayed on the front side (the uppermost side in an order in which images overlap) or the backside (the lowermost side) of the content of the existing main document, and is also referred to as a faint image. If it is desired to print a red character string "Confidential", for example, at the center of each page of a confidential document, software such as Acrobat (registered trademark) from Adobe (registered trademark) Systems Inc. may set the character string as a watermark for the confidential document. In addition, an image file such as a bitmap may also be set as a watermark. Since the PDL data (in the PDF format, for example) of the document for which a watermark is set is split into PDL data of the main document and PDL data of the watermark, the interpretation unit 34 may identify to which of the main document and the watermark each of these PDL data items corresponds.

The watermark smoothing unit 36 smoothes (flattens) the respective objects of the watermark, which are sequentially input from the interpretation unit 34, without changing the format from the intermediate data format. During the smoothing, the watermark smoothing unit 36 performs processing for the purpose of preventing a problem that a color at a portion where objects configuring a page with the watermark overlap becomes an overlapped color of the colors of the objects in a multiplexed manner. The intermediate data of the respective objects after the watermark smoothing unit 36 performs the processing thereon is transferred to the watermark buffer 42-2 of the back-end device 40. The processing performed by the watermark smoothing unit 36 will be described later in detail.

The logic page buffer 42-1 of the back-end device 40 accumulates the intermediate data of the respective objects in the respective pages (logic pages) of the main document, which are sequentially input from the interpretation unit 34, in a manner corresponding to the input order. The watermark buffer 42-2 accumulates the intermediate data of the respective objects of the watermark, which are input from the watermark smoothing unit 36, in a manner corresponding to the input order.

The coupling unit 43 unifies, in each output unit (for each page, for example), the intermediate data of the object groups that are stored in the logic page buffer 42-1 and the watermark buffer 42-2 and supplies the intermediate data to the depiction unit 44. The coupling is performed in accordance with the setting of the overlapping order between the logic page and the watermark. In a case of a typical setting in which the watermark overlaps the logic page, the coupling unit 43 supplies the intermediate data of the object group corresponding to the output unit, which is stored in the logic page buffer 42-1, to the depiction unit 44 in the output unit first, and then supplies the intermediate data of the object group, which is stored in the watermark buffer 42-2, to the depiction unit 44. In a case of a setting in which the logic page overlaps the watermark in contrast, the object group that is stored in the watermark buffer 42-2 is supplied to the depiction unit 44 first, and the object group that is stored in the logic page buffer 42-1 is then supplied thereto. In both cases, the object group that the coupling unit 43 extracts from the logic page buffer 42-1 changes in the output unit while the object group that the coupling unit 43 extracts from the watermark buffer 42-2 is the same regardless of the output unit.

The depiction unit 44 depicts (rasterizes) the intermediate data of the respective objects, which is sequentially supplied from the coupling unit 43, and reflects a pixel value as a result of the rasterizing in a memory region (such as a page memory) for holding an image in the output unit. By depicting all objects included in one page, a raster image (depiction image) of the page is formed. The generated depiction data of each page is stored in the output buffer 46 and is sequentially read by the printing device 50. The printing device 50 prints the depiction data of each page, which is read from the output buffer 46, on a paper.

The configurations of the front-end device 30 and the back-end device 40 are described hitherto. Next, a function of the watermark smoothing unit 36 will be described in more detail.

First, a description will be given of a problem that the watermark smoothing unit 36 handles, namely a problem that the color at the portion where objects of the watermark overlaps becomes the overlapped color of the colors of the objects in the multiplexed manner with reference to FIG. 3.

If an object (image element) included in the PDL data is large, the object is vertically and horizontally split into plural objects in tile shapes, and conversion into the intermediate data is then performed for the purpose of improving efficiency of image processing and the like. The splitting processing is also referred to as tiling or tile splitting, for example. If the splitting is simply performed, a gap occurs at a boundary between the objects after the splitting due to, for example, a rounding error generated when coordinates of the splitting boundary on the PDL data are converted into coordinates on the intermediate data, and the boundary outstandingly appears in some cases. Thus, the objects after the splitting are made to partially overlap each other so as not to generate the gap at the boundary between the objects in the related art.

Figure 3:
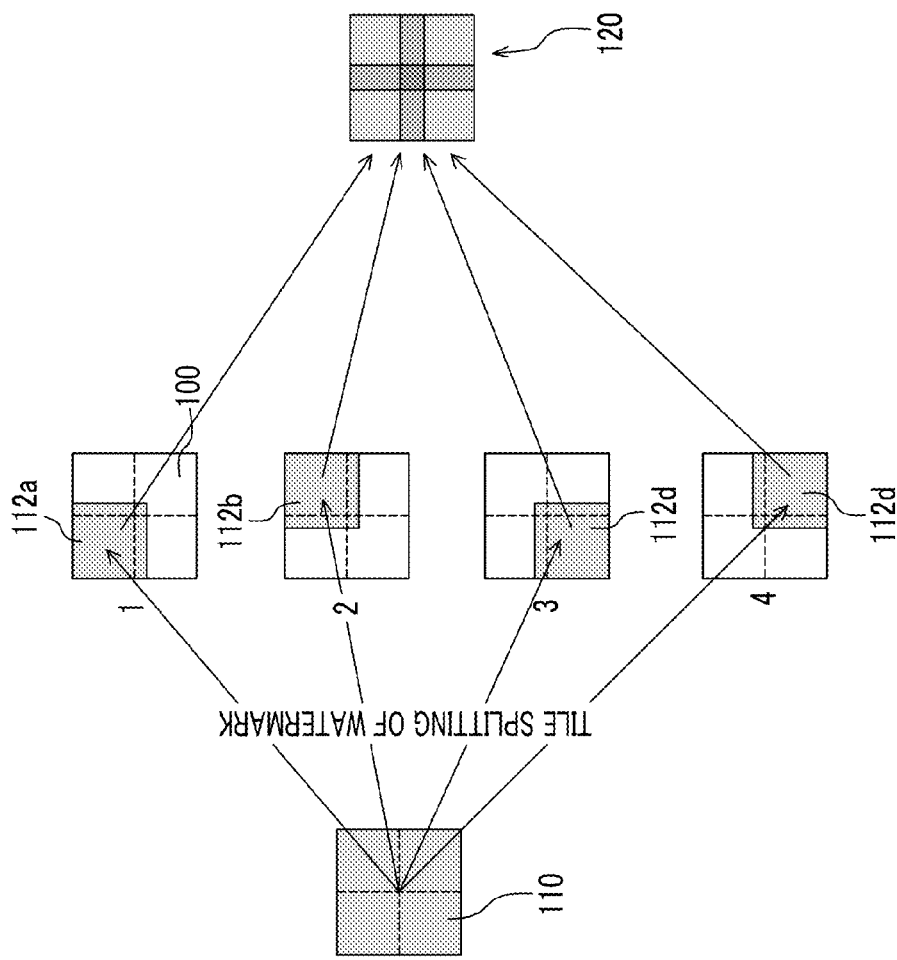
FIG. 3 is an explanatory diagram illustrating a problem that occurs when an object of a watermark held in the form of intermediate data is synthesized with a bitmap image of a main document.

In a case of simply splitting an object 110 (gray square) of a watermark with a size corresponding to a page 100 into two pieces vertically and horizontally in the example illustrated in FIG. 3, the object 110 is split at the vertical and horizontal bisectors (represented as broken lines in the drawing) thereof. However, since a gap may be generated at the boundary of the splitting, respective objects 112a to 112d as results of the splitting are made to have shapes that extend beyond the vertical and horizontal bisectors of the original object 110 so as to cover the original boundary lines (bisectors) with the overlapping portion of the objects 112a to 112d as the results of the splitting, in the related art. In a case of printing a document with a watermark, a page memory dedicated for the watermark is prepared, and the objects 112a to 112d as the results of the splitting are rasterized (depicted) in the page memory in the related art. At this time, an image of an object, which is to be depicted later, as a result of the rasterizing is overwritten at the overlapping portion of the objects. Therefore, the bitmap image of the watermark that is formed on the page memory does not include an overlapping portion of the split objects 112a to 112d.

In contrast, a case will be considered in which the page memory dedicated for the watermark is not prepared and the result of rasterizing the intermediate data of the objects 112a to 112d as the results of the splitting is directly synthesized with the bitmap image of the logic page of the main document. Since the watermark is synthesized with a base image at designated transmittance, colors (pixel values) of the objects are synthesized with each other at the transmittance at the overlapping portion of the split objects 112a to 112d. Therefore, the color of the overlapping portion becomes dark due to multiplexed synthesis of the color of the watermark (synthesis result 120 in the drawing).

The problem that occurs when the object of the watermark is split into tile shapes is described hitherto. However, the same problem occurs when the watermark itself is configured of plural objects that include overlapping portions even if tile splitting is not performed.

To handle such a problem, the watermark smoothing unit 36 deforms the objects in a level of the intermediate data so as to prevent the objects of the watermark from overlapping each other.

In the deformation processing, the watermark smoothing unit 36 stores the objects (intermediate data format) of the watermark, which are input from the interpretation unit 34, in a spool 37 in an input order. Then, the watermark smoothing unit 36 performs, during the storage, processing of deforming each object that has already been stored in the spool 37 into a shape acquired by removing a portion overlapping a newly stored object. The deformation processing is referred to as "eclipse" processing. "Eclipse" means that when a first object overlaps a second object, a portion, which overlaps with the first object, of the second object is blocked like solar eclipse or lunar eclipse. Here, the blocking is realized by deleting the portion which overlaps the first object from the shape of the second object. The deletion is realized by changing a description of the shape of the second object in the intermediate data to a description that represents the shape acquired by removing the portion which overlaps the first object. If the shape acquired as a result of deleting the portion which overlaps the first object, from the shape of the second object is not expressed in the intermediate data format, the shape as the result of the deletion may be split into plural objects that may be expressed in the intermediate data format. If the second object is completely hidden behind the first object, the second object itself is eliminated (that is, the description of the second object in the intermediate data is completely deleted).

Figure 4:
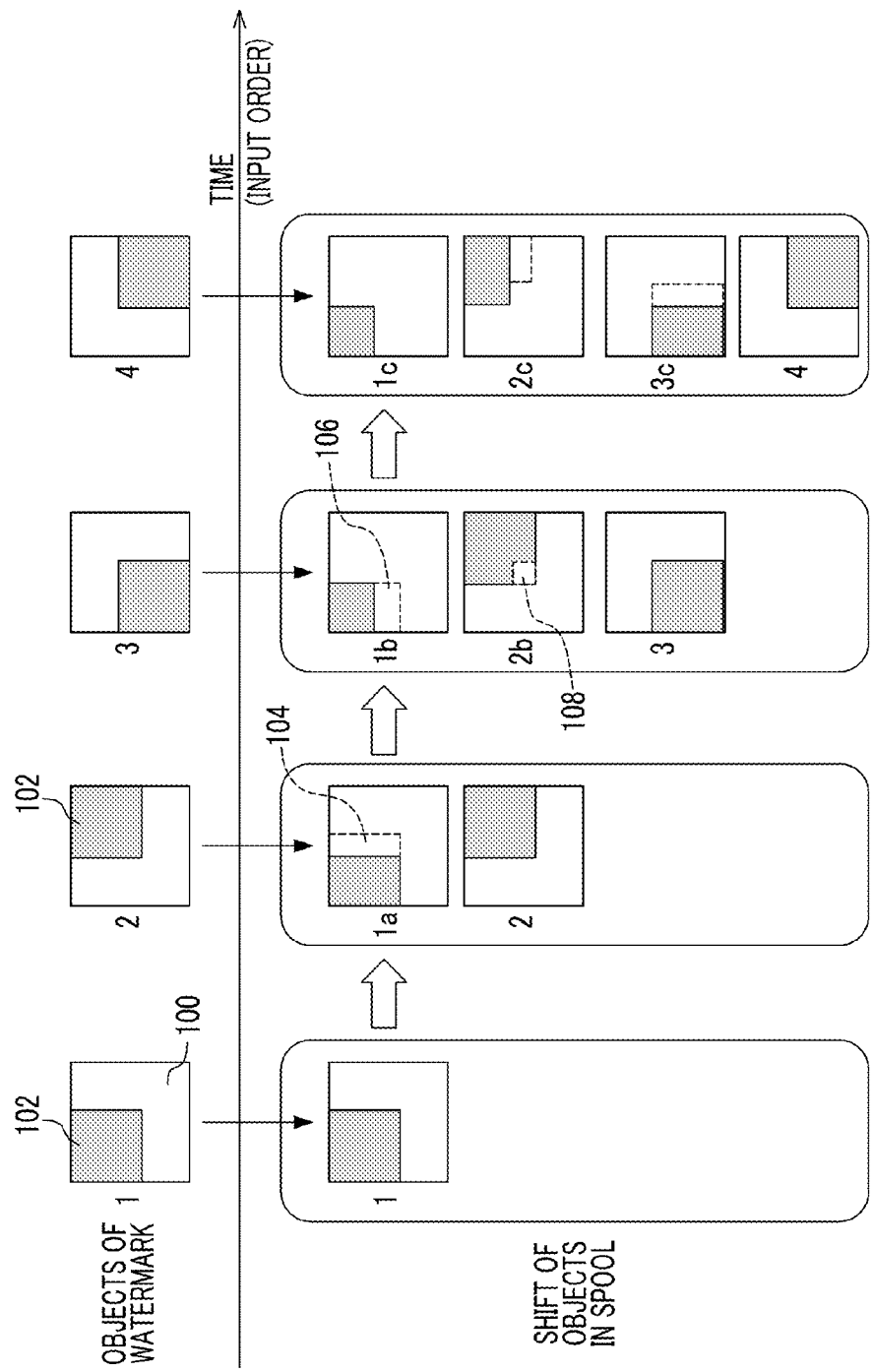
FIG. 4 is an explanatory diagram illustrating a shift of an object group in a spool when objects are sequentially input to a watermark smoothing unit.

Next, a description will be given of a flow of the eclipse processing performed by the watermark smoothing unit 36 with reference to FIG. 4. In this example, it is assumed that four objects 102 (the gray rectangles in the drawing which are acquired by splitting a single watermark into four parts, for example) that configure the page 100 of the watermark are input from the interpretation unit 34 to the watermark smoothing unit 36 in an order of the numbers from 1 to 4. In the following description, the objects are represented as an "object 1", an "object 2", and the like by using the numbers of the input order.

First, there is no object in the spool 37 when the object 1 is input. Therefore, the watermark smoothing unit 36 simply stores the object 1 in the spool 37.

When the object 2 is input, the watermark smoothing unit 36 performs the eclipse processing on the object 1 in the spool 37 based on the object 2. That is, the watermark smoothing unit 36 changes the shape of the object 1 into a shape acquired by removing a portion 104 overlapping the object 2. If the intermediate data is in the format in which a rectangle is expressed by a pair of coordinates of two apexes at the upper left corner and the lower right corner of the rectangle, for example, it is only necessary to change coordinates of the apex at the lower right corner of the rectangle of the object 1 to coordinates corresponding to a rectangle acquired by removing the overlapping portion 104, in the change of the shape. The object 1 after the change of the shape will be referred to as an object 1a. After the eclipse processing, the watermark smoothing unit 36 stores the object 2 in the spool 37.

When an object 3 is input, the watermark smoothing unit 36 performs the eclipse processing on the object 1a and the object 2 in the spool 37 based on the object 3. In doing so, the object 1a is deformed into an object 1b, and the object 2 is deformed into an object 2b. Thereafter, the object 3 is stored in the spool 37.

When an object 4 is input, the watermark smoothing unit 36 performs the eclipse processing on the object 1b, the object 2b, and the object 3 in the spool 37 based on the object 4. In doing so, the object 1b is deformed into an object 1c, the object 2b is deformed into an object 2c, and the object 3 is deformed into an object 3c. Thereafter, the object 4 is stored in the spool 37.

The function of the watermark smoothing unit 36 is described hitherto. Next, a description will be given of an exemplary procedure for processing that is executed by the interpretation unit 34 with reference to FIG. 5. In this example, it is assumed that the terminal device 10 issues a document for which a watermark has been set by two printing jobs for the watermark and a main document. In addition, it is assumed that each of the printing jobs includes information indicating which of the watermark and the main document the printing job corresponds to.

The interpretation unit 34 receives a printing job from the terminal device 10 via the printing job receiving unit 32 (S10) and then determines whether or not the printing job is for a watermark from the information included in the printing job (S12). If it is determined that the printing job is for a watermark, an output destination of intermediate data as a result of interpreting the printing job is set to the watermark smoothing unit 36 (S14). Otherwise, the output destination is set to the logic page buffer 42-1 of the back-end device 40 (S16).

After the setting of the output destination, the interpretation unit 34 acquires a page to be processed next from the print data of the printing job (S18). Then, a command to be processed next is extracted from a PDL description of the page (S20), and one or more objects in the intermediate data formats are generated by interpreting the command (S22). Then, the interpretation unit 34 sequentially outputs the generated objects to the output destination set in S14 or S16 (S24).

Thereafter, the interpretation unit 34 determines whether or not processing on the last command of the page has been completed (S26), and if not, the interpretation unit 34 returns to S20 to process the next command of the page. If it is determined in S26 that the processing on the page has been completed, the interpretation unit 34 further determines whether or not the processing on the last page of the printing job has been completed (S28), and if not, the interpretation unit 34 returns to S18 to perform the interpretation processing on the next page. If the processing on the last page of the printing job is completed, the processing of the printing job is completed.

Figure 5:
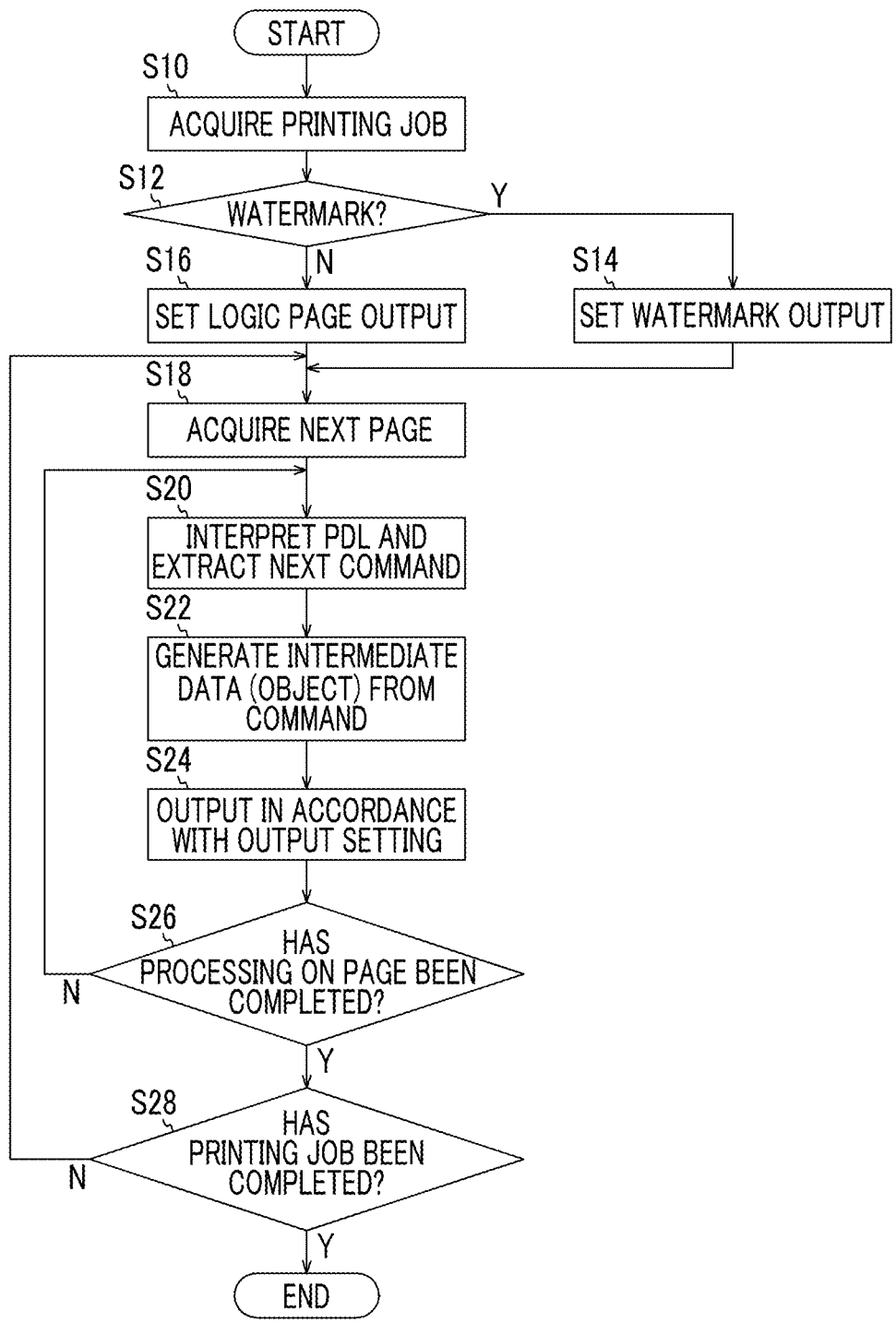
FIG. 5 is a diagram illustrating an exemplary procedure for processing performed by an interpretation unit.

In the example illustrated in FIG. 5, the different printing jobs for the watermark and the main document are input to the interpretation unit 34. However, even if both the watermark and the main document are included in a single printing job (PDL data), a portion corresponding to the watermark and a portion corresponding to the main document are identifiable in data of the printing job. Therefore, the same processing may be applied thereto.

Figure 6:
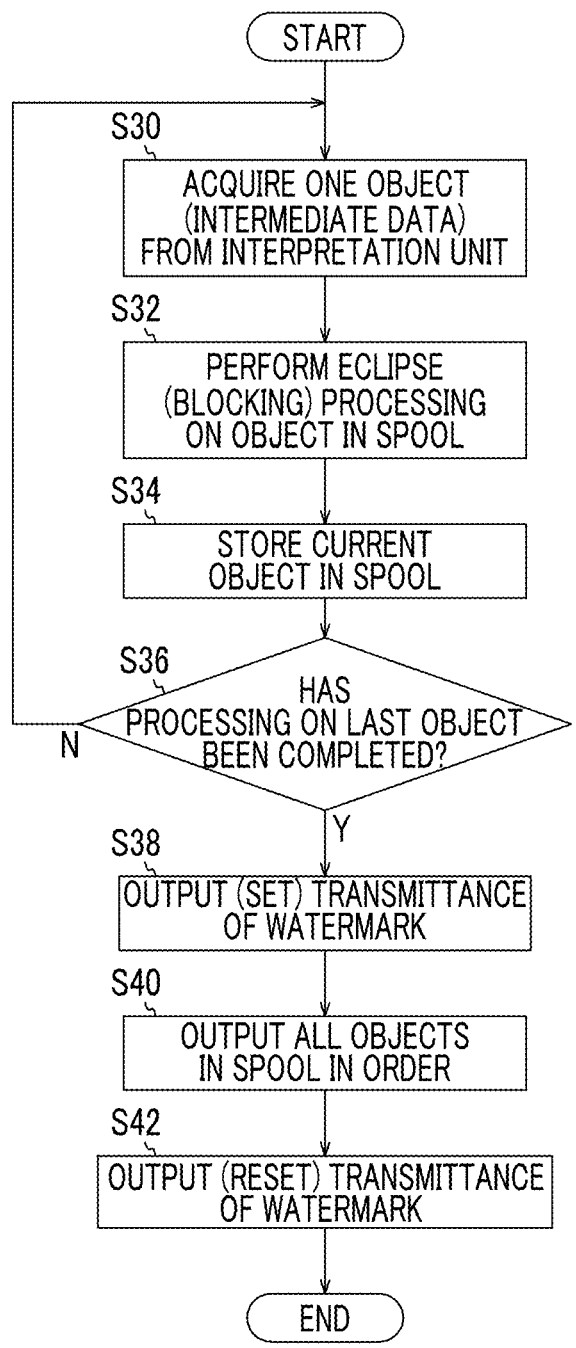
FIG. 6 is a diagram illustrating an exemplary procedure for processing performed by the watermark smoothing unit.

Next, a description will be given of an exemplary procedure for processing performed by the watermark smoothing unit 36 with reference to FIG. 6. According to the procedure, the watermark smoothing unit 36 acquires an object in the intermediate data format from the interpretation unit 34 first (S30), and then performs the eclipse processing on each of the objects, which are stored in the spool 37, based on the acquired object (S32). Then, the watermark smoothing unit 36 stores the acquired object in the spool 37 (S34). Information indicating a storage order (that is an order of input from the interpretation unit 34) is associated with each object stored in the spool 37. The aforementioned processing S30 to S34 is repeated up until the last object of the printing job for the watermark (S36).

If the processing on the last object is completed, the watermark smoothing unit 36 outputs a command in the intermediate data format for setting transmittance of the watermark to the watermark buffer 42-2 of the back-end device 40 first (S38). Here, a transmittance value of the watermark is included in the data of the printing job for the watermark and is provided from the interpretation unit 34 to the watermark smoothing unit 36. Next, the watermark smoothing unit 36 outputs each object (after the eclipse processing) in the spool 37 in the storage order (S40). Then, if output of the last object is completed, the watermark smoothing unit 36 outputs a command in the intermediate data format for resetting the transmittance of the watermark to the watermark buffer 42-2 (S42).

By the processing, the command for setting the transmittance of the watermark, the object group of the watermark, and the command for resetting the transmittance are stored in the watermark buffer 42-2 in association with the orders thereof. The coupling unit 43 reads the data in the order and inputs the data to the depiction unit 44.

Next, a description will be given of processing performed by the watermark smoothing unit 36 with reference to a specific example illustrated in FIG. 7.

Figure 7:
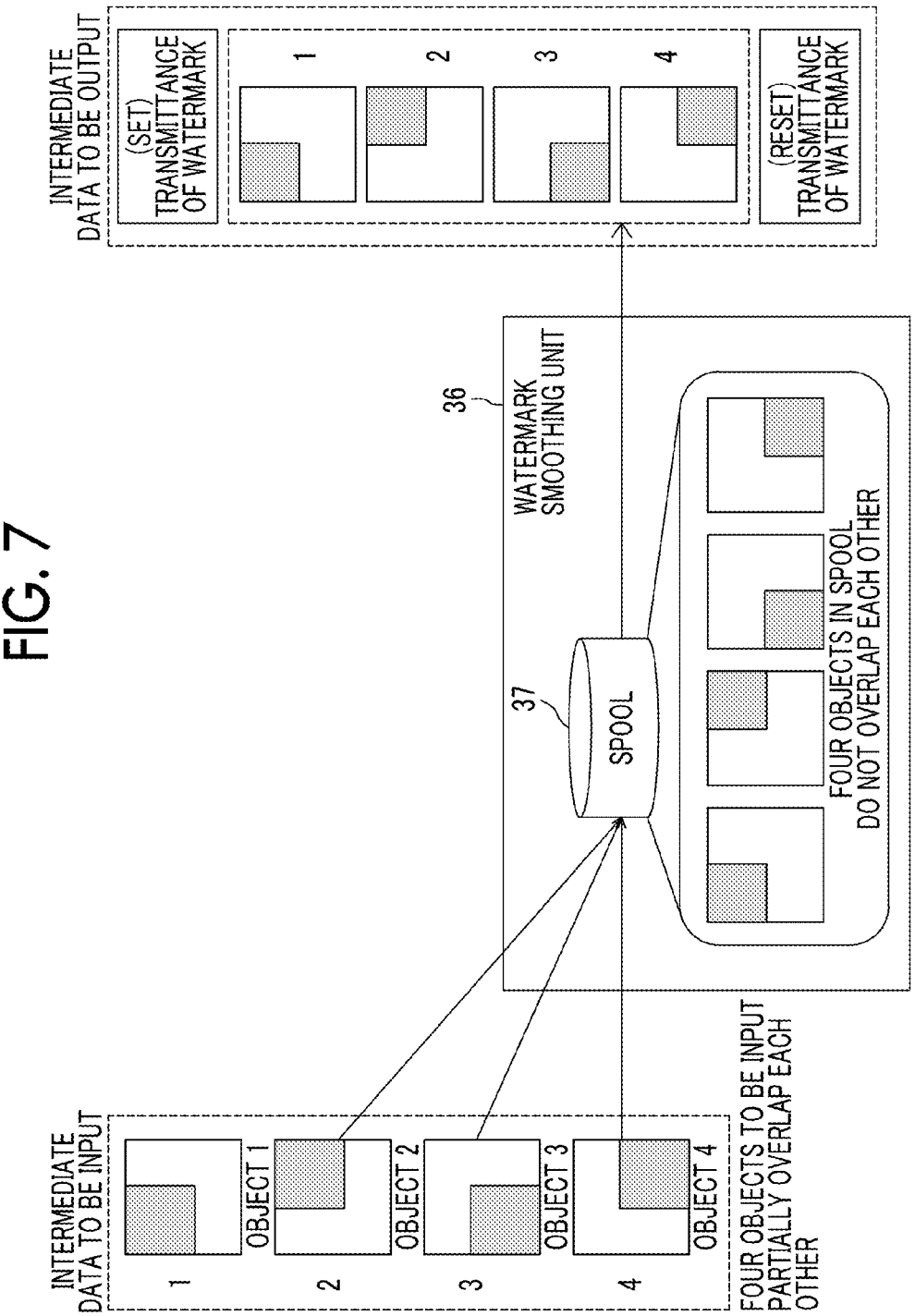
FIG. 7 is an explanatory diagram illustrating processing that is executed by the watermark smoothing unit.

It is assumed that four objects 1 to 4 illustrated on the left side in FIG. 7 are input in this order from the interpretation unit 34 to the watermark smoothing unit 36. These objects 1 to 4 are acquired by splitting a single large object of a watermark in PDL data into four portions for allowing the interpretation unit 34 to convert the object into intermediate data, and portions at which objects overlap each other are provided instead of performing simple splitting so as to prevent a gap from being generated at the boundaries of the four objects.

The watermark smoothing unit 36 sequentially stores the input objects 1 to 4 in the spool 37, and during the storage, the watermark smoothing unit 36 performs the eclipse processing on each object that has already been stored in the spool 37. In doing so, each object in the spool 37 acquires a shape with no overlapping portion, which is in contact with another object at the boundaries thereof.

Here, since the intermediate data format employs the same pixel coordinate system as that of the printing device 50 as described above in this exemplary embodiment, deformation of the objects by the eclipse processing, namely deletion of overlapping portions between the objects are precisely performed in units of pixels of the printing device 50. That is, the boundaries of the objects after the eclipse processing are completely in contact with each other in units of pixels, and no gap is generated.

A case will be considered in which an object is expressed by an abstract coordinate system that is independent from the pixel coordinate system of the printing device 50, like PDL data, the object is split into two parts at a boundary that is parallel with a coordinate axis, and the two objects as a result of the splitting are respectively rasterized in accordance with resolution of the printing device 50. In such a case, a gap may be generated between the two objects as the result of the splitting at the position of the boundary due to an error such as a rounding error generated when coordinates of the boundary in the coordinate system of the PDL are converted into coordinates in the pixel system of the printing device 50.

In contrast, if intermediate data expressed in the same pixel coordinate system as that of the printing device 50 as described above, the object may be precisely split at the boundary of the adjacent pixels. Therefore, it is possible to split the object without causing any gap in the same manner as in the splitting of a bitmap image. Accordingly, even when an existing object in the spool is deformed by the eclipse processing so as to eliminate a portion overlapping a new object which is newly stored in the spool, the boundary between the existing object and the new object coincides with a boundary between adjacent pixels in the pixel coordinate system of the printing device 50, and both the objects are completely in contact with each other in units of pixels. Therefore, no gap is generated at the boundary between the objects, and a portion with a dark color due to overlapping is not generated when the object group of the watermark after the eclipse processing is depicted.

In the exemplary embodiment, the watermark smoothing unit 36 processes the objects of the watermark regardless of an overlapping order of the watermark and the main document (logic page). However, the processing performed by the watermark smoothing unit 36 may not be applied to the object group of the watermark in a case of an overlapping order in which the main document overlaps the watermark (more strictly, no image is present under the watermark in the overlapping order). In such a case, since each object of the watermark may be directly depicted by knockout in the page memory, no overlapping is included in the page memory and the situation that the color of the watermark at the overlapping portion becomes darker does not occur even if the objects overlap each other. In such a case, the interpretation unit 34 outputs the intermediate data of the objects of the watermark to the watermark buffer 42-2 of the back-end device 40 instead of the watermark smoothing unit 36. The coupling unit 43 depicts each object, which is read from the watermark buffer 42-2, by knockout in the memory and further depicts each object of the logic page of the main document in the memory. In such a case, the processing is performed on the objects of the watermark at a higher speed since the watermark smoothing unit 36 is not used.

Incidentally, the image elements of the watermark are not deformed when the image element group of the watermark is located below an image element group other than the image element group of the watermark in an order in which images overlap.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data processing apparatus comprising:
an intermediate data acquisition section that acquires intermediate data which is generated from document data described in a page description language and includes a plurality of image elements;
an extraction section that extracts image elements of a watermark from among the image elements of the intermediate data acquired by the intermediate data acquisition section;
a deformation section that deforms each of the image elements of the watermark extracted by the extraction section into a shape that does not include an overlapping portion between the image elements of the watermark; and
an output section that outputs an image element group of the watermark deformed by the deformation section, to an image data generation device that generates image data for a printing device from the intermediate data.

2. The print data processing apparatus according to claim 1,
wherein the intermediate data expresses the shape of each of the image elements in a same pixel coordinate system as a pixel coordinate system of the printing device.

3. The print data processing apparatus according to claim 2,
wherein the deformation section does not deform the image elements of the watermark when the image element group of the watermark is located below an image element group other than the image element group of the watermark in an order in which images overlap.

4. The print data processing apparatus according to claim 1,
wherein the deformation section does not deform the image elements of the watermark when the image element group of the watermark is located below an image element group other than the image element group of the watermark in an order in which images overlap.

5. A non-transitory computer readable medium storing a program causing a computer to function as:
an intermediate data acquisition section that acquires intermediate data which is generated from document data described in a page description language and includes a plurality of image elements;
an extraction section that extracts image elements of a watermark from among the image elements of the intermediate data acquired by the intermediate data acquisition section;
a deformation section that deforms each of the image elements of the watermark extracted by the extraction section into a shape that does not include an overlapping portion between the image elements of the watermark; and
an output section that outputs an image element group of the watermark deformed by the deformation section, to an image data generation device that generates image data for a printing device from the intermediate data.

* * * * *